United States Patent [19]

Aoyagi et al.

[11] Patent Number: 4,680,227

[45] Date of Patent: Jul. 14, 1987

[54] FIRE-RETARDING RESIN COMPOSITION AND LAMINATED PRODUCT THEREOF

[75] Inventors: Yoshiki Aoyagi, Yokohama; Masatoshi Suzuki, Fujisawa; Tadashi Inoue, Yokohama; Kunio Tsukakoshi, Tokyo, all of Japan

[73] Assignee: Mitsubishi Chemical Industries Ltd., Tokyo, Japan

[21] Appl. No.: 802,168

[22] Filed: Nov. 25, 1985

[30] Foreign Application Priority Data

Nov. 27, 1984 [JP] Japan ................................ 59-249973
Dec. 19, 1984 [JP] Japan ................................ 59-267891

[51] Int. Cl.⁴ .......................... B32B 5/16; B32B 15/08
[52] U.S. Cl. .................................... 428/331; 106/18.2; 252/601; 428/461; 428/920; 428/921

[58] Field of Search ...................... 106/18.2, 18.12, 97, 106/99, 120; 252/601; 428/331, 461, 920, 921; 524/786, 730

[56] References Cited

U.S. PATENT DOCUMENTS

| | | | |
|---|---|---|---|
| 4,101,335 | 7/1978 | Barrable | 106/99 |
| 4,104,243 | 8/1978 | Howard, Jr. | 524/786 X |
| 4,162,924 | 2/1979 | Kubo et al. | 106/97 X |
| 4,187,210 | 2/1980 | Howard, Jr. | 524/730 |

Primary Examiner—Thomas J. Herbert
Attorney, Agent, or Firm—Oblon, Fisher, Spivak, McClelland & Maier

[57] ABSTRACT

A laminate composed of a fire-retardant resin composition comprising a polyolefin resin and hydrate of calcium silicate containing 30% by weight or more of platy crystals and/or needle shaped crystals with an aspect ratio of 3 or higher in sheet form and having metal sheet on both sides thereof.

7 Claims, 3 Drawing Figures

FIRE-RETARDING RESIN COMPOSITION AND LAMINATED PRODUCT THEREOF

BACKGROUND OF THE INVENTION

1. Field of the Invention

The present invention relates to a resin composition and a laminated product using such resin composition. More particularly, this invention is concerned with a fire-retarding or uninflammable resin composition obtained by mixing a specific inorganic filler into a polyolefin resin, and a laminated product composed of metal sheets or foils and such fire-retarding resin composition in sheet form interposed between the metal sheets.

2. Description of the Prior Art

Various kinds of material, when they are used, in general, as a building or constructional material, and so forth, are always desired to have higher uninflammability or fire-retarding property, because the higher the uninflammability or fire-retarding property thereof is, the wider will be their utility.

For instance, a laminated product of a metal-synthetic resin-metal structure obtained by interposing a synthetic resin sheet between a pair of metal sheets in a laminal structure possesses various features such that it is of light weight in its entirety, which is closer to that of the synthetic resin per se, and has the mechanical properties such as bendability, etc. and the heat-resistant property as well much superior to those of a product made simply of the resin composition to be used as the core material for the laminated product. In view of the fact that the synthetic resin sheet is covered on its both surfaces with the metal material, the laminated product has its considerably favorable fire-retarding property in comparison with the product made of such synthetic resin material alone. It has, however, been found out through the past experience in the practical use of such laminated product that, since the resin as the core material is usually exposed at the lateral end faces of the laminated product, the resin material catches on fire when the laminated product is exposed to flame, and the molten resin drips to cause fire to expand or spread. In order to remove such defect of an accidental nature, it is necessary that the resin to be the core material for the laminated product be vested with uninflammability or fire-retarding property.

For rendering the resin to be uninflammable or fire-retarding, there has so far been taken a measures such that a large amount of inorganic filling agent is mixed into a resin material such as polyolefin resins, etc. to thereby decrease its heat-generating quantity and, at the same time, to suppress production of black smoke so as to prevent molten resin from dripping.

As the inorganic filling agent to be mixed with the resin material for giving it the desired fire-retarding property, there have been known those inorganic fillers such as calcium carbonate, magnesium oxide, magnesium carbonate, calcium silicate, aluminum silicate, talc, and so forth; and inorganic hydrates containing therein crystal water such as aluminum hydroxide, magnesium hydroxide, and so on.

However, for the purpose of mixing, calcium carbonate, magnesium oxide, calcium silicate, talc, and other inorganic filling agents are required in an extremely large quantity, and no satisfactory result can be obtained practically unless it is in a quantity of 400 parts by weight or more with respect to 100 parts by weight of polyolefin resin. On the other hand, magnesium hydroxide, aluminum hydroxide, and other inorganic hydrates possess, to a certain extent, their effect of decreasing their heat-generating quantity and preventing the molten resin material from dripping, because such substance has the endothermic effect at the time of their decomposition by dehydration from heat of combustion. However, even these inorganic hydrates are unable to prevent the molten resin from dripping, unless they are mixed in an extremely large quantity such as, for example, as large as 300 parts by weight with respect to 100 parts by weight of polyolefin resin, when the resin material is required to have high uninflammability or fire-retarding property for those circumstances such as fire where the resin material should be subjected to high temperature flame, hence no satisfactory effect can also be obtained from such inorganic hydrates.

Such resin composition which requires a large amount of inorganic filling agent to be mixed thereinto becomes very difficult to be pelletized, hence it is unable to meet the practical purpose; and, when it is processed into a shaped product, it brings about decreased fluidity within the extruder or dies to make it difficult to be formed into an appropriate shaped product. Furthermore, the shaped product is liable to be brittle owing to loss of pliability which the polyolefin resin possesses, to increase its specific gravity, and other unfavorable effects.

When this resin is used in the afore-mentioned metal-resin-metal type laminated product, the uninflammability of the laminated product improves; however, there would inevitably brought about new disadvantages such that its bending property becomes considerably deteriorated with consequent breakage of the metal plates covering the surface of the core resin when the laminated product is subjected to bending. In addition, since the resin material has high specific gravity, the light weight property (the property specific to the laminated product) would be lost.

As the results of studies and researches done by the present inventors as to the cause for insufficient prevention of the molton resin material from dripping by those inorganic hydrates containing therein crystal water such as aluminum hydroxide and magnesium hydroxide, out of various inorganic fillers, which surely bring about decrease in heat of combustion and exhibit a certain degree of effect toward uninflammability of the resin, it has been found out that, as the first cause, the decomposition by dehydration of the crystal water takes place in a narrow range of temperature, that is to say, the decomposition by dehydration abruptly occurs in a temperature range of from 200° C. to 300° C. for aluminum hydroxide and in a temperature range of from 300° C. to 400° C. for magnesium hydroxide, which causes foaming by the water content to deprive the resin composition of its self-sustaining property, and, as the second cause, the filling agent is in a simple granular form which can not afford to bring about entanglement among such granules, hence such shape is not effective for prevention of the molten resin from dripping.

SUMMARY OF THE INVENTION

On the basis of such findings as mentioned in the preceding, the present inventors conducted further studies and researches with a view to obtaining the inorganic filling agent free from various problems as mentioned in the foregoing such as foaming to take place at the time of shaping, fluidity to decrease during the shaping process, and so on, and which is able to realize efficiently the decrease in the heat generating quantity, to prevent the molten resin from dripping, and to impart satisfactory sustaining property of shape at the time of combustion of the polyolefin resin. As the result of these studies and researches, they have discovered that calcium silicate type compound having a specific composition and shape is excellent as the filling material, that a resin composition prepared by mixing and kneading polyolefin resin and the above-mentioned calcium silicate type compound is excellent as the uninflammable or fire-retarding resin, and that a laminated product which is able to satisfy its excellent uninflammability and the bending property, at the same time, can be obtained by laminating metal plates on both surfaces of a sheet of the resin composition. In this way, they successfully completed the present invention.

It is therefore an object of the present invention to provide an improved uninflammable or fire-retarding resin composition made up of a polyolefin resin and a particular type of inorganic filling material in an amount much less than that of the conventional inorganic filling material, and yet capable of exhibiting excellent fire-retarding effect when it is subjected to burning flame.

It is another object of the present invention to provide an uninflammable or fire-retarding laminated product produced by interposing the above-mentioned improved uninflammable resin composition in sheet form between a pair of metal sheets or foils.

According to the present invention, in one aspect of it, there is provided an uninflammable resin composition consisting essentially of: 100 parts by weight of polyolefin resin; and from 10 to 100 parts by weight of hydrate of calcium silicate containing therein 30% by weight or more of platy crystal and/or needle-shaped crystal with its aspect ratio of 3 or higher, said hydrate being in the form of powder granule composed of secondary aggregate, in which said platy crystal and/or needle-shaped crystal are aggregated, and having its bulk density of 0.5 or lower, said polyolefin resin and said hydrate of calcium silicate being mixed and kneaded into said resin composition.

According to the present invention, in another aspect of it, there is provided a laminated product consisting essentially of a sheet of an uninflammable resin composition composed of 100 parts by weight of polyolefin resin; and from 10 to 100 parts by weight of hydrate of calcium silicate containing therein 30% by weight or more of platy crystal and/or needle-shaped crystal with its aspect ratio of 3 or higher, said hydrate being in the form of powder granule composed of secondary aggregate, in which said platy crystal and/or needle-shaped crystal are aggregated, and having its bulk density of 0.5 or lower; and metal plates laminated on both surfaces of said uninflammable resin sheet.

The foregoing objects, other objects as well as specific ingredients for constructing the uninflammable resin composition and the laminated product according to the present invention will become more readily apparent and understandable from the following detailed description thereof, when read in conjunction with several preferred examples thereof and the accompanying drawing, in which:

BRIEF DESCRIPTION OF THE DRAWINGS

FIGS. 1 to 3 are respectively micrographs in the scale of 5,000 magnification showing examples of granular structure of the aggregate body constituting the hydrate of calcium silicate for use as the inorganic filling agent according to the present invention, in which FIG. 1 is an example of needle-shaped crystal;

FIG. 2 is an example of platy crystal; and

FIG. 3 is an example of the needle-shaped crystal and the platy crystal.

DETAILED DESCRIPTION OF THE INVENTION

In the following, the present invention will be described in detail.

As the polyolefin resins to be used for the purpose of the present invention, there may be exemplified homopolymers of $\alpha$-olefins such as ethylene, propylene, butylene, and so forth; copolymers of the above-listed $\alpha$-olefins and other $\alpha$-olefins; block copolymers thereof; and blend of these polymers. In particular, the polyolefin resins containing polyetheylene as the principal constituent is preferably used.

The hydrate of calcium silicate is composed of $SiO_2$, $CaO$, and $H_2O$, in which at least 5 mol % or more of crystal water is contained. Examples of such hydrate of calcium silicate are: xonotlite ($6CaO \cdot 6SiO_2 \cdot H_2O$), tobermorite ($5CaO \cdot 6SiO_2 \cdot 5H_2O$), and so forth.

Figure 1:
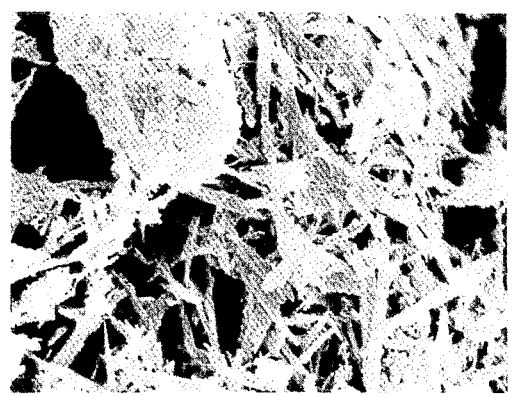
Figure 2:
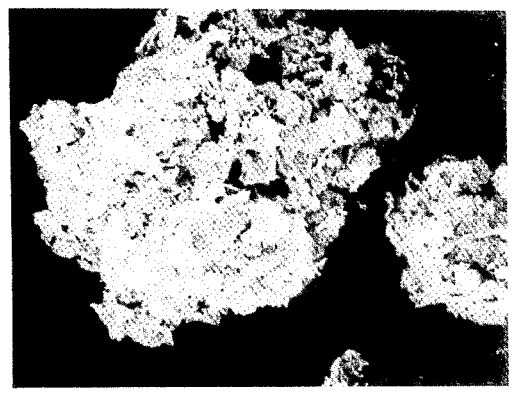
Figure 3:
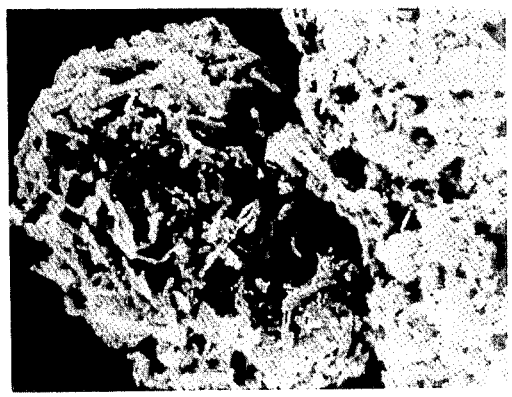

Powder granule of the hydrate of calcium silicate to be used for the purpose of the present invention is a secondary aggregate, in which the primary granules of the needle-shaped crystals and/or the platy crystals containing therein crystal water have become aggregated among themselves to form a secondary aggregate body of an extremely bulky structure. More specifically, the powder granule contains therein 30% by weight or more, or preferably 50% by weight or more, of the platy crystal and/or needle-shaped crystal with its aspect ratio (length/width) of 3 or higher, the platy crystal and/or needle-shaped crystal being aggregated into the secondary aggregate body of high bulk density. The bulk density of the powder granule is 0.5 or less, or preferably 0.3 or less. As the example of such powder granule, there are shown in FIGS. 1 to 3 those micrographs of the granular structure of the aggregate body constituting the powder granule of the hydrate of calcium silicate (in the scale of 5,000 magnification), wherein FIG. 1 shows the aggregate body consisting of the needle-shaped crystal; FIG. 2 shows the aggregate body consisting of the platy crystal; and FIG. 3 shows the aggregate body consisting of both needle-shaped crystal and platy crystal.

Incidentally, the content of the needle-shaped crystal and the platy crystal have been determined in such a manner that the powder granule consisting of the secondary aggregate of the crystals to be observed is placed in acetone, then it is subjected to vibration to disintegrate the aggregate body so as to disperse the secondary aggregate body into the primary granules (needle-shaped crystal or platy crystal), after which acetone is removed to enable the aggregate body to be observed under a microscope, within the sight of which the number of the needle-shaped crystal with its aspect ratio of 3 or higher is counted.

The powder granule consisting of the particular secondary aggregate body as mentioned above can be obtained from a heat insulating material of calcium silicate in the form of dust resulted from its cutting or in the form of powder resulted from its pulverization. For example, when a silicate material and lime are reacted under a normal pressure to form a swelled gel substance, and then the gel substance is shaped into a desired form, followed by curing the same by crystallization through the hydro-thermal curing reaction in an autoclave, and then drying the cured substance, there will be obtained a low density shaped body, in which very fine crystals are aggregated. When this low density shaped product is comminuted, there can be obtained the above-mentioned powder granule consisting of the secondary aggregate body. In another way, silicate and lime as the raw materials are mixed together in water in an autoclave to produce a slurry of xonotlite crystals, then fibers or other reinforcing materials are mixed with this slurry, followed by shaping the material into a shaped product and drying the same, to thereby obtain a low density shaped body, in which the needle-shaped crystals are aggregated. By pulverization of this low density shaped product, there can be obtained a powder granule of high bulk density, in which fine crystals containing therein crystal water and needle-shaped crystals with its aspect ratio of 3 or higher at a ratio of 30% or above are aggregated. It goes without saying that the hydrate of calcium hydroxide to be used for the purpose of the present invention should not be limited to this method of production, but any other appropriate methods which can satisfy the above-mentioned particular mixing ratio between the platy crystals and the needle-shaped crystals as well as the particular specific gravity of the resulting material may equally be employed.

The uninflammable or fire-retarding resin composition according to the present invention may be obtained by mixing and kneading 100 parts by weight of polyolefin resin and 10 to 100 parts by weight, or preferably 20 to 80 parts by weight of such powder granule of the hydrate of calcium silicate. When the quantity of the calcium silicate hydrate is too small, required effect of the fire-retarding property of the resin will be insufficient. On the contrary, when its quantity is too large, fluidity of the resin composition lowers to badly affect the shaping property. By the way, it may be permissible to mix other inorganic fillers into this resin composition for appropriately varying rigidity, hardness and other properties of the resin.

As the method for producing the resin composition according to the present invention, there may be adopted a high speed mixing roll, a banbury mixer, a screw extruder, and other mixer-kneaders, all being in general use, in which the mixture of the materials is kneaded in a molten state under heat. Incidentally, there may also be added at the time of mixing and kneading various additives such as anti-oxidant, ultraviolet absorbant, and other stabilizers; smoothing agent; antistatic agent; pigment; carbon black; and so forth, depending on necessity.

While the resulted resin composition can be used in various fields of application, it is particularly suitable in the field of constructional or building material where the requirement for its uninflammability or fire-retarding property is highly stringent and in which field the resin composition is used as the core material to be interposed between metal plates to form a laminated panel.

In the following, explanations will be given as to the laminated product of a metal-resin-metal structure, in which use is made of a sheet of the above-mentioned resin composition.

For the purpose of manufacturing the above-mentioned laminated product, the resin composition is used in the form of a sheet having its thickness of from 0.5 to 10 mm, or preferably from 0.5 to 6 mm. The metal material to be used for this purpose is principally in the form of a foil or a thin sheet of 0.01 to 1 mm in thickness, or preferably from 0.1 to 0.5 mm thick. For the metal, there may be used aluminum, alloys of aluminum, steel, tin-free steel, stainless steel, tin-plated steel, zinc-coated steel, and others. These metal materials may also be subjected to surface-treatment. It should also be noted that the metal material to be sticked onto both surfaces of the core resin material may be one and the same kind or different kinds, and that the thickness thereof may be the same or different.

The resin composition to be the core material for the laminated product may be attached directly onto the metal sheet, or adhered thereto through an intermediate adhesive layer of, for example, an adhesive polyolefin resin having thickness of from 10 to 50 $\mu$m, when both sheets of the resin composition and the metal should be required to have tight adhesion between them. It may also be feasible that such adhesive polyolefin resin is mixed into the uninflammable resin composition.

The laminated product can be obtained by laying the metal sheets over both surfaces of the core sheet of the resin composition, or by laying the metal sheets over both surfaces of the core sheet of the resin composition with the adhesive layer being interposed between them, after which the laminates are compressed under heat by means of a hot press.

In another method, the laminated product can be manufactured by introducing the core sheet of the resin composition extruded from an extrusion T-dies sheet forming machine into a space between a pair of metal sheets which are continuously fed into a nipping part composed of a pair of mutually opposed and reversely rotating laminating rollers. In this case, sufficient heat and pressure are indispensable for sticking together the core sheet of the resin composition and the metal sheets. Such heat as required may be obtained by heating the laminating rollers, or heat from melt-extrusion of the core sheet, or both.

In the case of using the intermediate adhesive layer, it may be attached initially onto the metal sheet, or onto the core resin sheet, or onto both metal sheet and core resin sheet simultaneously.

In the present invention, the method of producing the metal-resin-metal laminate is not limited at all, but any known methods can be appropriately employed, such as extrusion coating, extrusion lamination, film lamination, or combination of these methods. It should, however, be noted that, in any of these methods, the essential requirement is to subject the laminated materials to heat for a period of time, during which the intermediate adhesive agent and the core resin composition will be heated to a temperature at least equal to their softening point so as to attain tight adhesion of the resin, and to pressure as well, under which the resin and the metal may be brought into a tight contact each other.

While various methods may be adopted for increasing the adhesive strength of the resin layer, a preferable method is to use an adhesive polyolefin resin. For such adhesive polyolefin resin, there may be employed modified polyolefins or any polyolefins containing therein an adhesive polymer.

The modified polyolefin is a substance, in which polyolefin has been modified with unsaturated carboxylic acid or its anhydride, or derivatives of the unsaturated carboxylic acid or its anhydride. The modification is carried out in accordance with the known method, wherein such modifying compound is mixed with or grafted to polyolefin, or the acid radical or the acid anhydride radical of the thus obtained modified polyolefin is further changed into its derivatives. Further, this modification can also be done by mixing the thus obtained modified polyolefin with an unmodified polyolefin.

As the polyolefins to be used for the production of such modified polyolefins, there may be exemplified: low density polyethylene, medium density polyethylene, high density polyethylene, polypropylene, poly-1-butene, poly-4-methyl-1-pentene, copolymer of ethylene and propylene, copolymer of ethylene-1-butene, copolymer of propylene-1-butene, and blends of these polymers.

As the unsaturated carboxylic acid or its anhydrides to be mixed with or grafted to these polyolefins, there may be enumerated acrylic acid, methacrylic acid, maleic acid, maleic anhydride, citraconic acid, citraconic anhydride, itaconic acid, itaconic anhydride, and so forth. Further, as the derivatives of the unsaturated carboxylic acid or its anhydrides, there may be exemplified esterified product of mono-epoxy compounds and the above-mentioned acid, reaction products of the acid and polymers containing in their molecules those radicals which can react with these acids, and others.

Such modifying agent should preferably be present in the modified polyolefins at a ratio of from 0.01 to 3% by weight. The modified polyolefin which is usually used in preference is the one obtained by grafting 300 to 3,000 ppm of maleic anhydride to the polyolefin.

It is, of course, feasible that those coloring matters, stabilizers, fillers, and various other additives be further mixed with the modified polyolefins.

The polyolefins mixed with an adhesive polymer are designated by those adhesive polyolefin resins obtained by mixing with the polyolefin a polymer resulted from reaction between a hydrocarbon polymer containing at least one active hydrogen at the end part of its molecule and in which 6.0% or more of its main chain is saturated and an unsaturated polycarboxylic acids or their derivatives as well as mono-epoxy compounds and their derivatives (vide: for example, Japanese patent publication No. 6012/1978).

As mentioned in the foregoing, there are two types of adhesive polyolefins to be used in the present invention, the shaping process of which may possibly be done in exactly the same way as in ordinary polyolefins. That is to say, any of the various known techniques of extrusion coating, extrusion lamination, and film lamination can be equally applicable.

In spite of its low content of the inorganic filling agent, the uninflammable or fire-retarding resin composition according to the present invention as described in the foregoing exhibits very excellent fire-retarding effect, in addition to which its shaping property is satisfactory, hence its shaping by extrusion and other methods is also possibly applicable.

The products obtained by use of the resin composition according to the present invention not only possesses its uninflammable or fire-retarding property, but also it has a relatively low specific gravity and a flexibility as well. For example, the above-mentioned laminated product possesses its excellent uninflammable effect despite its low content of the inorganic filler, is light in weight, and has sufficient bending property at a normal temperature, hence it is an industrially useful material.

With a view to enabling those persons skilled in the art to put the present invention into practice, the following actual examples are presented. It should, however, be understood that the present invention is not limited to these examples alone. Also, for the sake of showing superiority of the product according to the present invention over the conventional product in its various characteristics and properties, several comparative examples are presented.

EXAMPLE 1

50 parts by weight of calcium silicate (dust resulted from cutting of "KEICAL ACE"—a tradename for a product of Nippon Keical K.K., Japan—which is a powder granule of the secondary aggregate composed of 70% by weight or more of needle-shaped crystals of a xonotlite structure and having the aspect ratio of 3 or higher and a bulk density of 0.06) was mixed with 100 parts by weight of a low density polyethylene ("NOVATEC-L F 100"—a product of Mitsubishi Chemical Co., Ltd., Japan). The mixture was kneaded for ten minutes at a temperature of 230° C. in a banbury mixer, after which the kneaded mixture was taken out of the mixer and cooled. Then, this kneaded mixture as cooled was pulverized, followed by forming it into pellets of the uninflammable resin composition. Subsequently, the pellets were shaped into a sheet having thickness of 1.5 mm by use of a hot press machine heated to a temperature of 230° C. Following this, the thus obtained sheet of the uninflammable resin composition was interposed between a pair of aluminum sheets, each having thickness of 0.25 mm, and the laminates were then subjected to the melt-adhesion by means of a hot press, thereby forming a sandwich-type laminated plate of an aluminum-uninflammable resin composition-aluminum structure. When this laminated plate was subjected to bending by 90 degrees with a radius of 30 mm, no crack was found to have occurred in the aluminum sheets.

From this laminated plate, two sheets of rectangular plates, each having a size of 5 cm wide×20 cm long, were cut out. This rectangular sheet was placed on an inverted "T" (⊥) bar which had been set horizontally along the longitudinal direction of the laminated sheet, and then the lower surface of the sheet was fired for ten minutes with a gas burner to measure an ignition time for the lower surface of the rectangular sheet, an ignition time for the upper surface thereof, and a time for the uninflammable resin composition to become molten and start dripping. The results of the measurements are shown in Table 1 below.

It was found that the ignition time for the lower surface and the upper surface to set fire was retarded, and that the state of burning of the resin composition after ignition indicated a small burning flame and a very slow burning speed. After ten minutes' burning, the gas burner was put out, and a time during which the burning flame remained was observed. It was eight seconds. Further, no melt-dripping of the resin could be observed at all.

EXAMPLE 2

Exactly same procedures were followed as in Example 1 above, with the exception that, as the calcium silicate material, use was made of dust from cutting of a heat insulating material produced by Nichias K.K., Japan (a powder granule having a bulk density of 0.1, which is a secondary aggregate consisting of 50% by weight or more of platy crystals in the tobermorite structure), with which the resin composition was prepared.

Then, the burning test was conducted on this resin composition in the same manner as in Example 1 above. The results of the test were excellent as shown in Table 1 below.

COMPARATIVE EXAMPLE 1

A resin composition was produced in the same manner as in Example 1 above with the exception that, as the calcium silicate material, use was made of a granular body having a bulk density of 1.0 and being in a wollastonite structure containing therein no crystal water. The thus obtained resin composition was then subjected to the same burning test. The results are as shown in Table 1 below, from which it is noted that the lower surface and the upper surface of the resin sheet quickly set fire with large burning flame and immediately started melt-dripping, hence no fire-retarding effect could substantially be recognized.

COMPARATIVE EXAMPLES 2 TO 4

The same procedures were followed as in Example 1 above with the exception that, in place of calcium silicate, use was made of calcium carbonate, aluminum hydroxide, and magnesium hydroxide, respectively. The test results are as shown in Table 1 below.

EXAMPLE 3

The resin composition was manufactured in the same manner as in Example 1 above with the exception that, as the calcium silicate material, use was made of dust from cutting of a heat insulating material manufactured by Asahi Ishiwata Kogyo K.K., Japan (a powder granule having a bulk density of 0.14, which is a secondary aggregate consisting of needle-shaped crystals in the xonotlite structure and with its aspect ratio of 3 or higher and platy crystals). The burning test was conducted in the same manner as in Example 1 above. The results were very favorable as shown in Table 1 below.

EXAMPLE 4

Pellets of uninflammable resin composition were produced by the process of mixing 100 parts by weight of calcium silicate same as that used in Example 1 above with respect to 100 parts by weight of linear low density polyethylene ("NOVATEC-U-EX-20"-a product of Mitsubishi Chemical Industries, Co. Ltd., Japan) in the Henschel mixer, then kneading and extruding the mixture in and from a biaxial kneading and extruding machine having a screw diameter of 30 mm into the required pellets. Subsequently, the pellets were shaped into a sheet of 1.5 mm thick by means of a T-dies sheeting machine. No particular points of problem took place in the sheet forming operation. By use of this sheet of the resin composition, the laminated plate was manufactured in the same manner as in Example 1 above, which was then subjected to the burning test. The results are as shown in Table 1 below, from which it will be noted that the fire-retarding performance of the resin sheet was very satisfactory.

EXAMPLE 5

The same procedures as in Example 4 above were followed, with the exception that calcium silicate same as that used in Example 2 above was employed in the mixing quantity of 15 parts by weight. The results of the burning test are as shown in Table 1 below, from which it will be noted that the fire-retarding performance of the resin sheet was favorable.

COMPARATIVE EXAMPLE 5

In exactly the same manner as in Example 4 above with the exception that the mixing quantity of calcium silicate was 5 parts by weight, the fire-retarding performance of the resin sheet was comparared. The results are shown in Table 1 below.

COMPARATIVE EXAMPLE 6

Pellets of the fire-retarding resin composition were manufactured by use of the biaxial kneading and extruding machine in the same manner as in Example 4 above with the exception that the mixing quantity of calcium silicate was made 200 parts by weight. Subsequently, attempt was made as to forming by extrusion of the thus obtained pellets into a resin sheet of 1.5 mm thick by use of a T-dies sheeting machine, but no sheet forming could be successful owing to extremely poor fluidity of the resin material.

COMPARATIVE EXAMPLE 7

The same laminated plate was manufactured in the same manner as in Example 1 above by use of 100 parts by weight of linear low density polyethylene and 300 parts by weight of magnesium hydroxide.

When it was subjected to the burning test, the laminated plate exhibited favorable fire-retarding performance as shown in Table 1 below. However, when it was subjected to bending by 90 degrees with a radius of 30 mm as done in Example 1 above, there occurred cracks in the aluminum sheet.

EXAMPLE 6

A sheet of the uninflammable resin composition having thickness of 1.5 mm was formed in the same manner as in Example 4 above with the exception that the mixing quantity of calcium silicate was made 50 parts by weight. Subsequently, a laminated sheet having a laminar structure of alminum/adhesive polyolefin resin/uninflammable resin composition/adhesive polyolefin resin/aluminum was formed by attaching an adhesive polyethylene resin film ("NOVATEC AP420L" film having thickness of 50 microns, a product of Mitsubishi Chemical Industries, Co. Ltd., Japan) on the mutually opposed one surface side of each of a pair of aluminum sheets (having a thickness of 0.25 mm each), then interposing the sheet of the uninflammable resin composition between these aluminum sheets, and subjecting the laminates to melt-adhesion by means of a hot press. The thus obtained laminated sheet was bent by an angle of 90 degrees with a radius of 30 mm, from which no cracks were found to have occurred in the aluminum sheets. Also, the laminated product was subjected to the burning test in the same manner as in Example 1 above, the results of which are very favorable as indicated in Table 1 below.

TABLE 1

| | RESIN COMPOSITION | | BURNING TEST | | | |
|---|---|---|---|---|---|---|
| | | | Ignition Time | | Melt-Dripping | |
| | Polyolefins (part by wt.) | Fillers (part by wt.) | Lower Surface | Upper Surface | Occured min. after burning | Size of Burning Flame |
| EXAMPLE 1 | low density polyethylene 100 | calcium silicate 50 | 5 min. | 9 min. | not occured | small |
| EXAMPLE 2 | low density polyethylene 100 | calcium silicate 50 | 5 min. | no firing | not occured | small (on and off occasionally) |
| EXAMPLE 3 | low density polyethylene 100 | calcium silicate 50 | 4 min. 30 sec. | 8 min. | not occured | small |
| EXAMPLE 4 | linear low density polyethylene 100 | calcium silicate 100 | 9 min. | no filing | not occured | small (on and off occasionally) |
| EXAMPLE 5 | linear low density polyethylene 100 | calcium silicate 15 | 3 min. 30 sec. | 6 min. 30 sec. | not occured | medium |
| EXAMPLE 6 | linear low density polyethylene 100 | calcium silicate 50 | 4 min. 30 sec. | 8 min. | not occured | small |
| COMPARATIVE EXAMPLE 1 | low density polyethylene 100 | calcium silicate 100 | 3 min. | 5 min. | 4 min. (vigorous) | large |
| COMPARATIVE EXAMPLE 2 | low density polyethylene 100 | calcium carbonate 100 | 3 min. | 4 min. 30 sec. | 3 min. 30 sec. (vigorous) | large |
| COMPARATIVE EXAMPLE 3 | low density polyethylene 100 | aluminum hydroxide 100 | 3 min. 30 sec. | 5 min. | 4 min. (vigorous) | large |
| COMPARATIVE EXAMPLE 4 | low density polyethylene 100 | magnesium hydroxide 100 | 3 min. 30 sec. | 5 min. 30 sec. | not occured | large |
| COMPARATIVE EXAMPLE 5 | linear low density polyethylene 100 | calcium silicate 5 | 3 min. | 5 min. 30 sec. | 7 min. | large |
| COMPARATIVE EXAMPLE 7 | linear low density polyethylene 100 | magnesium hydroxide 300 | 8 min. | no firing | not occured | small |

What is claimed is:

1. A laminated product composed of a plurality of metal sheets; and a fire-retarding resin composition in a sheet form, said fire-retarding resin composition consisting essentially of 100 parts by weight of polyolefin resin, and 10 to 100 parts by weight of hydrate of calcium silicate containing therein 30% by weight or more of platy crystals and/or needle-shaped crystals with its aspect ratio of 3 or higher, said hydrate being in the form of powder granule composed of a secondary aggregate, in which said platy crystals and/or needle-shaped crystals are aggregated, and having its bulk density of 0.5 or lower, and said metal sheets being laminated on both surfaces of said fire-retarding resin sheet.

2. A laminated product according to claim 1, wherein said hydrate of calcium silicate is one selected from the group consisting of xonotlite and tobermorite.

3. A laminated product according to claim 1, wherein said metal sheet is made of a material selected from the group consisting of aluminum, iron and stainless steel.

4. A laminated product according to claim 1, wherein said hydrate of calcium silicate is in the form of a powder granule having bulk density of 0.3 or lower and containing therein 50% by weight or more of platy crystals and/or needle-shaped crystals with its aspect ratio of 3 or higher.

5. A laminated product according to claim 1, wherein said polyolefin resin sheet is composed 100 parts by weight of polyolefin resin and 20 to 80 parts by weight of hydrate of calcium silicate.

6. A laminated product according to claim 1, wherein a layer of an adhesive polyolefin resin is interposed between said fire-retarding resin sheet and said metal sheet.

7. A laminated product according to claim 6, wherein said polyolefin resin is one selected from the group consisting of polyethylene and polypropylene, and said adhesive polyolefin resin is one selected from the group consisting of modified polyolefins and polyolefins mixed with said modified polyolefins.

* * * * *